(12) United States Patent
Burke, Jr. et al.

(10) Patent No.: US 6,993,228 B2
(45) Date of Patent: Jan. 31, 2006

(54) DISPERSION COMPENSATED OPTICAL FIBER TRANSMISSION SYSTEM AND MODULE INCLUDING MICRO-STRUCTURED OPTICAL FIBER

(75) Inventors: James P. Burke, Jr., Huntsville, AL (US); Dirk Mueller, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 193 days.

(21) Appl. No.: 10/640,591

(22) Filed: Aug. 13, 2003

(65) Prior Publication Data
US 2005/0036752 A1 Feb. 17, 2005

(51) Int. Cl.
G02B 6/02 (2006.01)
G02B 6/16 (2006.01)
H04B 10/12 (2006.01)

(52) U.S. Cl. ............... 385/123; 385/126; 385/127; 385/128; 398/140; 398/147; 398/148

(58) Field of Classification Search ............... 385/50, 385/123–128, 141–145
See application file for complete search history.

(56) References Cited

U.S. PATENT DOCUMENTS

| | | | | |
|---|---|---|---|---|
| 5,042,906 A | * | 8/1991 | Chesler et al. ............... | 385/123 |
| 5,361,319 A | | 11/1994 | Antos et al. ................. | 385/123 |
| 5,430,822 A | * | 7/1995 | Shigematsu et al. | |
| 5,608,562 A | * | 3/1997 | Delavaux et al. | |
| 5,781,673 A | | 7/1998 | Reed et al. .................... | 385/24 |
| 5,802,236 A | * | 9/1998 | DiGiovanni et al. | |
| 5,838,867 A | * | 11/1998 | Onishi et al. ................. | 385/123 |
| 5,995,694 A | * | 11/1999 | Akasaka et al. ............ | 385/123 |
| 5,999,679 A | | 12/1999 | Antos et al. ................ | 385/127 |
| 6,157,754 A | * | 12/2000 | Sasaoka et al. | |
| 6,243,522 B1 | | 6/2001 | Allan et al. .................. | 385/123 |
| 6,259,845 B1 | | 7/2001 | Sardesai ...................... | 385/123 |
| 6,334,017 B1 | | 12/2001 | West .......................... | 385/123 |
| 6,339,665 B1 | * | 1/2002 | Danziger | |
| 6,393,188 B1 | * | 1/2002 | Jeong et al. | |
| 6,404,950 B1 | * | 6/2002 | Tsukitani et al. | |
| 6,404,964 B1 | * | 6/2002 | Bhagavatula et al. | |
| 6,418,258 B1 | | 7/2002 | Wang ......................... | 385/123 |
| 6,421,484 B2 | * | 7/2002 | Tanaka et al. | |
| 6,445,862 B1 | | 9/2002 | Fajardo et al. .............. | 385/125 |
| 6,445,864 B2 | | 9/2002 | Jiang et al. .................. | 385/127 |
| 6,501,892 B1 | * | 12/2002 | Okuno et al. | |
| 6,546,178 B2 | | 4/2003 | Jiang et al. .................. | 385/127 |
| 6,580,861 B2 | * | 6/2003 | Bickham et al. | |

(Continued)

FOREIGN PATENT DOCUMENTS

EP 1 148 360 A2 10/2001

OTHER PUBLICATIONS

"Trisection Wide Spectral Band Fiber Dispersion Compensation" Hsu et al., *IEEE Photonics Technology Letters*, vol. 4, No. 4, Apr. 1992.

(Continued)

*Primary Examiner*—Frank G. Font
*Assistant Examiner*—Ryan Lepisto
(74) *Attorney, Agent, or Firm*—Svetlana Z. Short

(57) ABSTRACT

Disclosed is an optical transmission system and module which includes a negative dispersion, dispersion compensating optical fiber coupled to a micro-structured optical fiber (such as band gap fiber, photonic crystal fiber or holey fiber) for compensating for the accumulated dispersion in a transmission fiber. The optical transmission system and module in accordance with the invention provides substantially equal compensation of total dispersion over an operating wavelength band, reduced overall system length, and lower insertion loss.

14 Claims, 9 Drawing Sheets

U.S. PATENT DOCUMENTS

| | | | |
|---|---|---|---|
| 6,628,872 B2 * | 9/2003 | Hada et al. ................. | 385/123 |
| 6,633,712 B2 * | 10/2003 | Dennis et al. | |
| 6,693,740 B2 * | 2/2004 | Gray et al. .............. | 359/337.4 |
| 6,721,481 B2 * | 4/2004 | Terahara et al. ........... | 385/122 |
| 6,853,766 B2 * | 2/2005 | Tsukitani et al. ............ | 385/27 |
| 2002/0005969 A1 * | 1/2002 | Ranka ....................... | 359/161 |
| 2002/0012512 A1 * | 1/2002 | Elrefaie et al. ............. | 385/125 |
| 2002/0061176 A1 | 5/2002 | Libori et al. ................ | 385/125 |
| 2002/0102084 A1 * | 8/2002 | Srikant ....................... | 385/124 |
| 2002/0114597 A1 | 8/2002 | Brimacombe et al. ...... | 385/123 |
| 2002/0154877 A1 | 10/2002 | Li et al. ..................... | 385/127 |
| 2002/0176676 A1 * | 11/2002 | Johnson et al. | |
| 2002/0196498 A1 * | 12/2002 | Watanabe et al. .......... | 359/135 |
| 2003/0039435 A1 * | 2/2003 | Srikant et al. ............... | 385/24 |
| 2003/0056546 A1 | 3/2003 | Claus et al. .................. | 65/386 |
| 2003/0056550 A1 | 3/2003 | Tanaka et al. ............... | 65/428 |
| 2003/0059186 A1 | 3/2003 | Hebgen et al. ............. | 385/127 |
| 2003/0081915 A1 | 5/2003 | Fajardo et al. ............... | 385/96 |
| 2003/0091309 A1 | 5/2003 | Hebgen et al. ............. | 385/127 |
| 2004/0071419 A1 * | 4/2004 | Berkey et al. .............. | 385/123 |
| 2004/0105640 A1 * | 6/2004 | Hasegawa ................... | 385/125 |
| 2004/0109229 A1 * | 6/2004 | Seguineau et al. ....... | 359/341.3 |
| 2004/0184815 A1 * | 9/2004 | Korolev et al. ............. | 398/148 |

OTHER PUBLICATIONS

XP001176993; Nov. 1, 2003; Koshiba et al; "Finite-Element Analysis of Birefringence and Dispersion Properties in actual and Idealized Holey-Fiber Structures"; Applied Optics; vol. 42; No. 31 pp. 6267-6275.

XP000968675; Jul. 2000; vol. 12, No. 7; pp. 807-809; Knight et al; "Anomalous Dispersion in Photonic Crystal Fiber"; IEEE Photonics Technology Letters, IEEE Inc. New York, US.

XP008043721; Mar., 2002; p. 222, Tokyo, Japan; Suzuki et al; Proc. Ieice General Conference; the whole document; Figures 1,2; Table 1.

* cited by examiner

DISPERSION COMPENSATED OPTICAL FIBER TRANSMISSION SYSTEM AND MODULE INCLUDING MICRO-STRUCTURED OPTICAL FIBER

BACKGROUND OF THE INVENTION

1. Field of the Invention

The present invention relates generally to optical fiber transmission systems, and particularly to a transmission systems designed such that they include compensation for dispersion across their length.

2. Technical Background

Dispersion compensation techniques in telecommunications systems or lines have been used successfully. A technique useful in lines already installed is one in which total dispersion (also called chromatic dispersion) is compensated for by an appropriately designed dispersion compensating fiber. For example, some systems include dispersion compensating fibers formed into a dispersion compensating module that can be inserted into the line at an access point, such as an end of the line. Such fibers typically have negative dispersion and may also have negative dispersion slope at 1550 nm. Several examples of dispersion compensating fibers may be found in U.S. Pat. Nos. 6,546,178; 6,445,864; U.S. Pat. No. 5,999,679; U.S. Pat. No. 5,361,319; U.S. Ser. No. 2002/0102084; U.S. Ser. No. 2002/0154877; WO 01/59496; WO 00/67053; and WO 01/73486.

Certain transmission systems have included micro-structured optical fiber to compensate for buildup of dispersion in the system. EP 1 148 360 discloses one such system including a microstructure fiber 10 (See FIG. 3) having a core region 12 surrounded by inner cladding 14 and outer cladding 16. The inner cladding 14 includes a plurality of features 14.1 (such as capillary air holes) that serve to lower the refractive index of the inner cladding. The micro-structured optical fiber 10 has a positive dispersion and is optically coupled to a negative dispersion single mode fiber having relatively small negative dispersion. The micro-structured optical fiber is used to compensate for the accumulated dispersion in the negative dispersion single mode fiber.

Another dispersion compensation scheme involves the use of both positive and negative dispersion fibers in the cables of the line. Each cable may contain both positive and negative total dispersion waveguide fibers, or the link or span can be formed using cables having only positive dispersion together with cables having only negative dispersion. This compensation scheme avoids the drawbacks associated with the dispersion compensation module, namely that the length of dispersion compensating fiber does not contribute to the span length, but necessarily complicates the installation of the system. The complication being that the dispersion sign and length of a particular cable or of the fibers in the cable must be identified during installation.

More recently, an alternative dispersion compensation technique has been developed wherein a dispersion compensating fiber is provided in the span having a total dispersion and a total dispersion slope which effectively mirrors that of the transmission fiber. That is, a ratio of total dispersion divided by total dispersion slope, kappa, has the same value for the transmission fiber and the dispersion compensating fiber. This fiber type is disclosed and discussed in U.S. Ser. No. 2002/0028051 incorporated herein by reference in its entirety. For the telecommunications system in which mirror fiber is used, the dispersion compensation is said to be perfect in that the end to end accumulated dispersion of a span including a transmission fiber and the dispersion compensating fiber is zero across the entire wavelength range of operation. The result of such a configuration is that signals in the fiber traverse significant span lengths in which the total dispersion is zero or near zero.

Other systems that include dispersion and slope compensation may be found in WO 02/099,483; U.S. Ser. No. 2003/0059186; and U.S. Ser. No. 2003/0091309. Multiple fiber solutions including at least three fibers arranged in series are taught in U.S. Pat. Nos. 5,042,906; 5,430,822; 5,781,673; 5,995,694; and U.S. patent application Ser. Nos. 2002/0102084; 2003/0039435; and 2003/0091309. However, to accomplish dispersion compensation across the entire wavelength band of interest, the amount of fiber needed to accomplish such compensation may be excessive. Moreover, such systems may suffer from excessive insertion loss.

Micro-structured optical fibers have also been employed for compensating accumulated dispersion of a transmission optical fiber in optical transmission systems. Micro-structured optical fibers are taught in U.S. Pat. Nos. 6,334,017; 6,243,522; 6,445,862; 5,802,236; 6,418,258; U.S. patent application Ser. No. 2002/0061176; and EP 1 148 360, for example.

There is, therefore, a need for optical transmission systems that provide excellent dispersion compensation over broad wavelength ranges and which compensate for dispersion with shorter lengths of optical fiber.

SUMMARY OF THE INVENTION

Definitions

The following definitions are in accord with common usage in the art.

Refractive Index Profile—The refractive index profile is the relationship between the relative refractive index and the optical fiber radius. The relative refractive index is measured relative to the refractive index of the cladding. Positive relative refractive index is provided for portions of the refractive index profile having refractive index greater than the cladding, while those portions having lower refractive index that the cladding are negative.

Segmented Core—A segmented core is one that is divided into at least a first and a second waveguide fiber core portion or segment. Each portion or segment is located along a particular radial length, is substantially symmetric about the fiber's centerline, and has an associated refractive index profile. For example, a segmented core may include a central core and a lowered refractive index annular segment, referred to as a moat.

Radius—The radii of the segments of the core are defined in terms of the respective refractive indexes at respective beginning and end points of the segments. The definitions of the radii used herein are set forth in the figures and the discussion thereof. The radii herein are measured from the centerline of the fiber to an appropriate point of the segment. Unless otherwise defined, the appropriate point on the segment for measurement of the radius is the point where the respective segment crosses the refractive index zero corresponding to the refractive index of the cladding.

Total Dispersion—Total dispersion, sometimes called chromatic dispersion, of an optical fiber is the sum of the material dispersion, the waveguide dispersion, and the inter-modal dispersion. In the case of single mode optical fibers the inter-modal dispersion is zero. The sign convention generally applied to the total dispersion is as follows. Total dispersion is said to be positive if shorter wavelength signals travel faster than longer wavelength signals in the waveguide. Conversely, in a negative total dispersion waveguide, signals of longer wavelength travel faster.

Effective Area—The effective area is $A_{\textit{eff}}=2\pi(\int E^2\, r\, dr)^2/(\int E^4\, r\, dr)$, where the integration limits are 0 to ∞, and E is the electric field associated with light propagated in the waveguide, generally measured at 1550 nm.

Relative Refractive Index—The relative refractive index percent is defined as $$\Delta\% = 100 \times (n_i^2 - n_c^2)/2n_i^2$$

where $n_i$ is the maximum refractive index in region i, unless otherwise specified, and $n_c$ is the average refractive index of the cladding region. In those cases in which the refractive index of a segment is less than the average refractive index of the cladding region, the relative index percent is negative and is calculated at the point at which the relative index is most negative, unless otherwise specified.

Micro-structured Optical Fiber—An optical fiber having a light guiding core surrounded by a silica-containing structure with an arrangement of air holes formed therein which extend along the longitudinal length of the fiber. The core may include an air hole such as in a photonic band gap fiber or silica or doped silica such as in a photonic crystal fiber.

Optical Telecommunications System—An optical fiber telecommunications system, or simply a transmission system, is made up of a transmitter of light signals, a receiver of light signals, and a span of optical waveguide fiber having respective ends optically coupled to the transmitter and receiver to propagate light signals therebetween. The length of optical waveguide fiber can be made up of a plurality of shorter lengths that are spliced or connected together in end to end series arrangement or otherwise optically coupled. The system may include additional optical components such as optical amplifiers, optical attenuators, optical switches, optical filters, multiplexing or demultiplexing devices, or other optical or electro-optical devices therein.

In accordance with embodiments of the invention, an optical transmission system is provided having a dispersion compensating fiber optically coupled to a micro-structured optical fiber. The transmission system comprises a transmitter and a receiver, and an optical fiber span optically coupled to the transmitter and receiver. The span includes a transmission optical fiber having a positive dispersion at 1550 nm, a dispersion compensating fiber having a negative dispersion at 1550 nm optically coupled to the transmission optical fiber, and a micro-structured optical fiber optically coupled to the dispersion compensating optical fiber. The dispersion compensating fiber and the micro-structured optical fiber substantially compensate for accumulated dispersion of the length of transmission optical fiber. Preferably both the dispersion compensating fiber and the micro-structured optical fiber are included in a dispersion compensating module.

The micro-structured optical fiber preferably has a body of silica-containing glass with an arrangement of holes positioned a distance from a fiber centerline and surrounding a light guiding core. Exhibited properties of the micro-structured optical fiber are that it preferably has a positive total dispersion at 1550 nm; more preferably of greater than 50 ps/nm/km at 1550 nm; and most preferably between about 100 and 150 ps/nm/km at 1550 nm.

In accordance with a further embodiment of the invention, an optical transmission system is provided having a transmitter and receiver, and an optical fiber span optically coupled to the transmitter and receiver, the span including a transmission optical fiber having positive dispersion and positive dispersion slope at 1550 nm, a dispersion compensating optical fiber optically coupled to the transmission optical fiber having a negative total dispersion at 1550 nm of between about −100 and −160 ps/nm/km and a negative dispersion slope at 1550 nm, and a micro-structured optical fiber optically coupled to the dispersion compensating optical fiber wherein the micro-structured optical fiber comprises a body of silica-containing glass with an arrangement of holes positioned a distance from a fiber centerline and surrounding a light guiding core, the micro-structured optical fiber having a positive total dispersion at 1550 nm of greater than 50 ps/nm/km.

In accordance with yet another embodiment of the invention, a dispersion compensating module is provided, comprising a dispersion compensating optical fiber having a negative total dispersion at 1550 nm of between about −100 and −160 ps/nm/km and a negative dispersion slope at 1550 nm, and a micro-structured optical fiber optically coupled to the dispersion compensating optical fiber wherein the micro-structured optical fiber comprises a body of silica-containing glass with an arrangement of holes positioned a distance from a fiber centerline and surrounding a light guiding core, the micro-structured optical fiber having a positive total dispersion at 1550 nm of greater than 50 ps/nm/km.

Additional features and advantages of the invention will be set forth in the detailed description which follows, and in part will be readily apparent to those skilled in the art from that description or recognized by practicing the invention as described herein, including the detailed description which follows, the claims, as well as the appended drawings. It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE INVENTION

Reference will now be made in detail to the present preferred embodiments of the invention, examples of which are illustrated in the accompanying drawings. Wherever possible, the same reference numbers will be used throughout the drawings to refer to the same or like parts.

Figure 1:
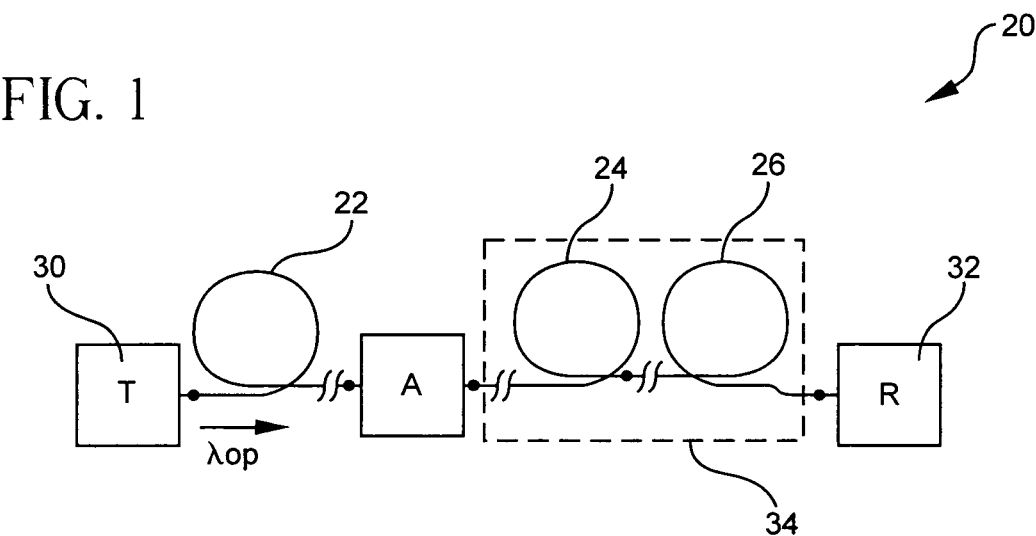
FIG. 1 is a diagram of a transmission system in accordance with the present invention.

An exemplary embodiment of the optical transmission system 20 in accordance with the invention is shown in FIG. 1. The optical transmission system 20 includes and optical fiber span having a length of transmission fiber 22 optically coupled in series relationship to a length of dispersion compensating fiber 24 which is likewise optically coupled in series relationship to a micro-structured fiber 26. The optical coupling may be through direct splicing, through optical components or devices, through connectors or through bridge or other transition fibers. Bridge fiber may be employed between the dispersion compensating fiber 24 and the micro-structured fiber 26 when the effective areas or mode fields of the fibers are non-equal. The transmission fiber 22 has the longest length in the span.

The goal of the system design is to select lengths of the dispersion compensating fiber 24 and micro-structured optical fiber 26 which together compensate for the accumulated dispersion of the transmission fiber 22. Preferably, the dispersion compensating fiber 24 and the micro-structured fiber 26 are housed in a module 34. For example, each fiber 24, 26 may be wound onto separate reels which are then mounted in a common housing. Optionally, they may be spliced to one another and wound onto one reel to form the module. A further option would be to splice the fibers together in a cabled system such that the dispersion compensating fiber 24 and the micro-structured fiber 26 will contribute to the overall length of the span. Splicing between conventional optical fibers and micro-structured optical fibers is taught in U.S. Ser. No. 2003/0081915 to Fajardo et al.

The optical transmission system 20 may further include an optical transmitter 30 and an optical receiver 32 for launching and receiving light signals at a wavelength λop within the operating wavelength band of the system. The optical fiber span is preferably optically coupled to the transmitter 30 and receiver 32. The coupling may be by the transmitter and receiver being located at the end of the span, or there may be additional sections of transmission fiber connected to the span at one or both ends. It should be recognized that although a one-way signal path is described herein, systems including signal transmission in both directions are also contemplated.

Figure 11:
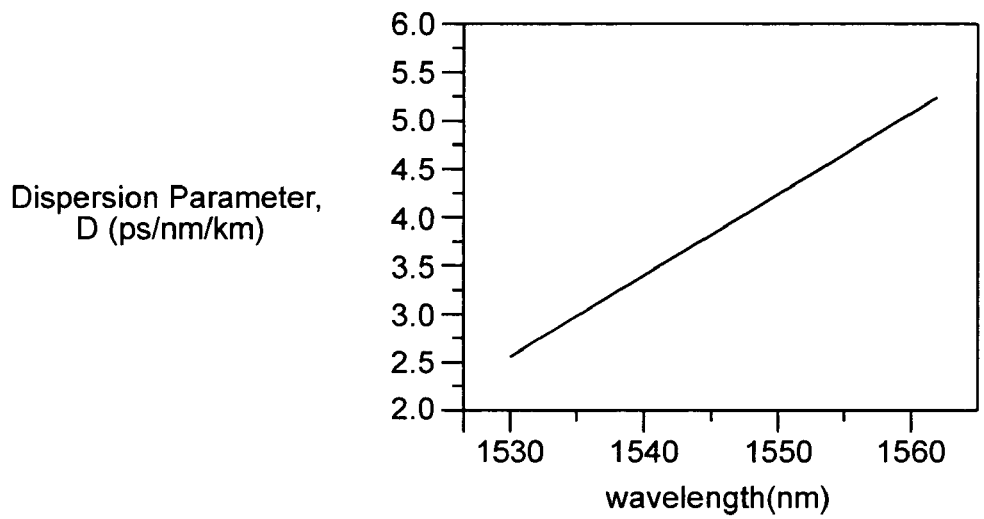
FIG. 11 is a plot of dispersion as a function of wavelength for an embodiment of transmission optical fiber which may be included in the present invention.
Figure 12:
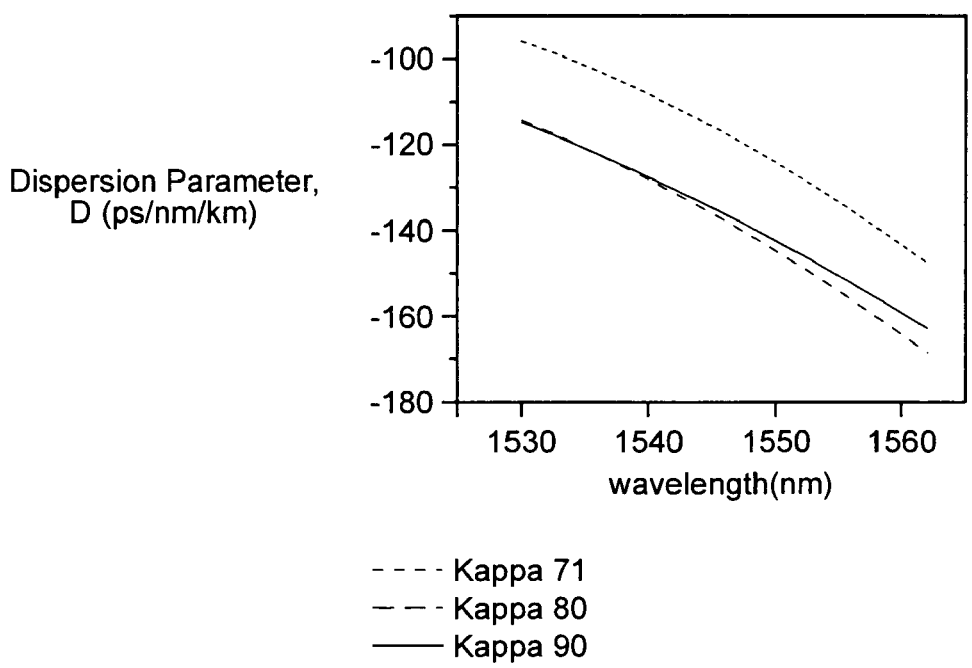
FIG. 12 is a plot of dispersion as a function of wavelength for several embodiments of dispersion compensating fiber which may be included in the present invention.

In the span, the transmission optical fiber 22 preferably has a positive total dispersion at 1550 nm; more preferably between about 3.2 and 5.3 ps/nm/km at 1550 nm. The transmission fiber may be LEAF® optical fiber available from Corning Incorporated of Coming, N.Y., for example, which exhibits a total dispersion plot as a function of wavelength as shown in FIG. 11. The transmission optical fiber 22 preferably also exhibits has a positive total dispersion slope at 1550 nm which is preferably between about 0.063 and 0.106 ps/nm$^2$/km. In a preferred embodiment, the transmission optical fiber 22 also exhibits has a kappa, defined as the total dispersion at 1550 nm divided by the total dispersion slope at 1550 nm, of preferably less than 100 nm; and more preferably between 40 and 70 nm.

Figure 7:
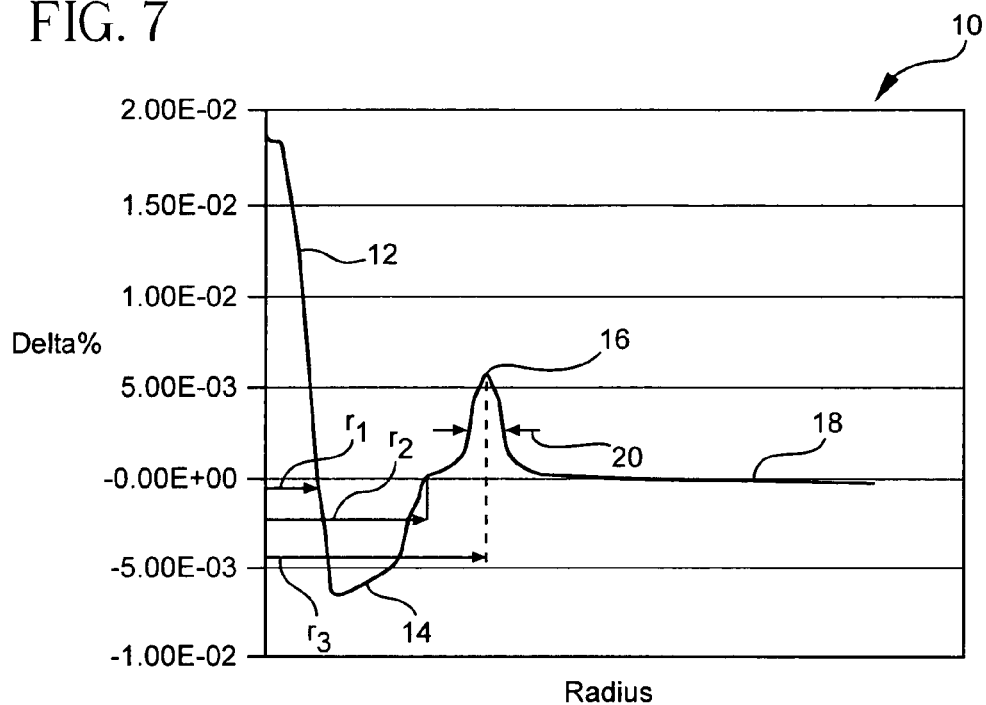
FIGS. 7 and 8 are plots of refractive index profiles of embodiments of dispersion compensating optical fibers which may be used in accordance with the present invention.
Figure 8:
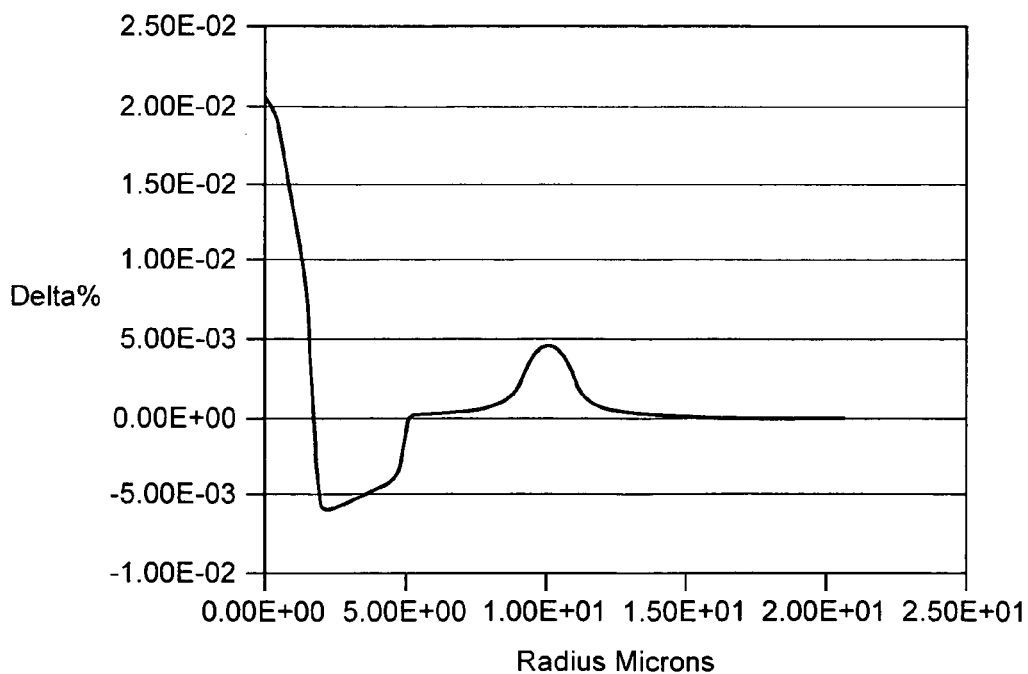

The dispersion compensating fiber 24 preferably has a negative total dispersion and total dispersion slope at 1550 nm. More preferably, the dispersion compensating fiber 24 has a total dispersion more negative than −75 ps/nm/km at 1550 nm; and in most embodiments, the total dispersion at 1550 nm is between about −100 and −160 ps/nm/km. The total dispersion slope at 1550 nm of the dispersion compensating optical fiber 24 is preferably negative and preferably between about −1.4 and −2.0 ps/nm$^2$/km at 1550 nm. Kappa at 1550 nm for the dispersion compensating fiber 24 is preferably less than 100 nm; and most preferably between 65 and 95 nm at 1550 nm. The dispersion compensating fiber 24 preferably includes a segmented core structure having a central core 12, a moat 14 and a ring 16 as are shown in FIGS. 7 and 8 herein. FIGS. 7 and 8 illustrate several possible refractive index profiles that may be used to achieve the desired range of dispersion and kappa. U.S. Pat. Nos. 6,445,864 and 6,546,178 describe several embodiments of dispersion compensating fiber 24 that may be used in the present invention. It should be recognized that the dispersion compensating fiber design is not restricted to the profile designs described herein, and that W-shaped or other profiles shapes may be employed as well.

In the transmission system 20, the micro-structured optical fiber 26 is preferably connected and optically coupled between the dispersion compensating fiber 24 and may be coupled directly to the receiver 32 or to a fiber in the next adjacent span. The micro-structured optical fiber 26 preferably has a positive total dispersion at 1550 nm which is preferably greater than 50 ps/nm/km at 1550 nm; and more preferably between about 100 and 150 ps/nm/km at 1550 nm. The total dispersion slope of the micro-structured optical fiber 26 at 1550 nm may be either positive or negative, but is most preferably positive.

Together, the dispersion compensating fiber 24 and the micro-structured optical fiber 26 substantially compensate for accumulated dispersion of the transmission fiber 22 in the transmission system 20 such that at the end of a span including the full lengths of the transmission fiber 22, compensation fiber 24, and micro-structured optical fiber 26, total dispersion is substantially compensated for. Being substantially compensated for includes the situation where dispersion for the span is made to be approximately equal to zero for the span across the operating wavelength band, but also situations where the total dispersion is slightly over or under compensated. In particular, the lengths of the dispersion compensating fiber 24 and micro-structured fiber 26 are selected with the goal that the residual dispersion across the span is minimized. Because of the large dispersion values achievable with a micro-structured optical fiber 26, compensation may be achieved with a small length of fiber as used for conventional trimming techniques. A further advantage of using a micro-structured optical fiber 26 is that slope compensation may be achieved without varying the dispersion at 1550 nm, for example, by adjusting the air hole size while maintaining the air hole spacing.

Figure 2:
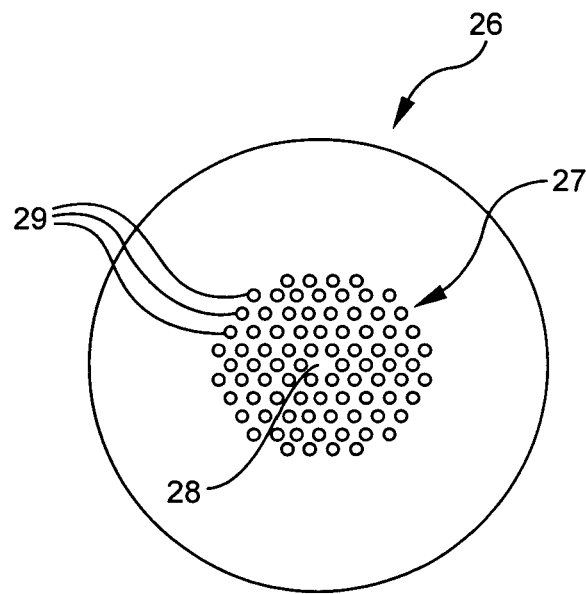
FIG. 2 is a cross-sectioned view of a first embodiment of a micro-structured optical fiber which may be used in accordance with the present invention.
Figure 3:
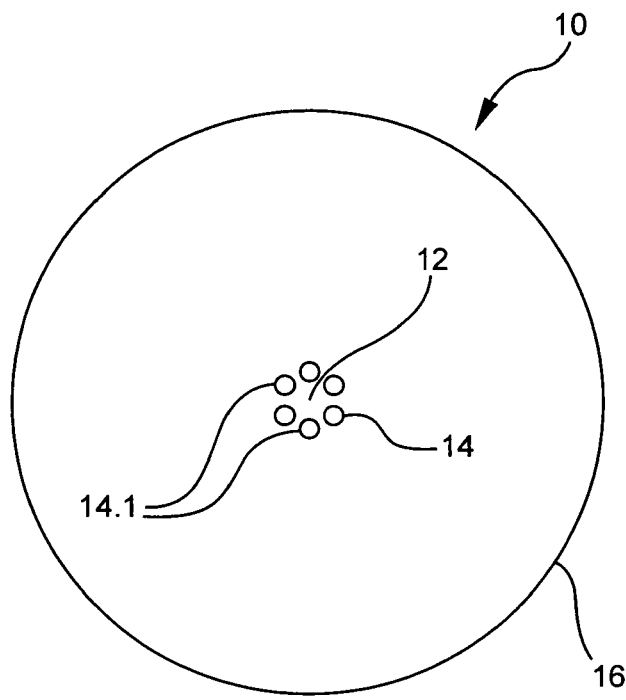
FIG. 3 is a cross-sectioned view of a first embodiment of a micro-structured optical fiber which may be used in accordance with the present invention.
Figure 4:
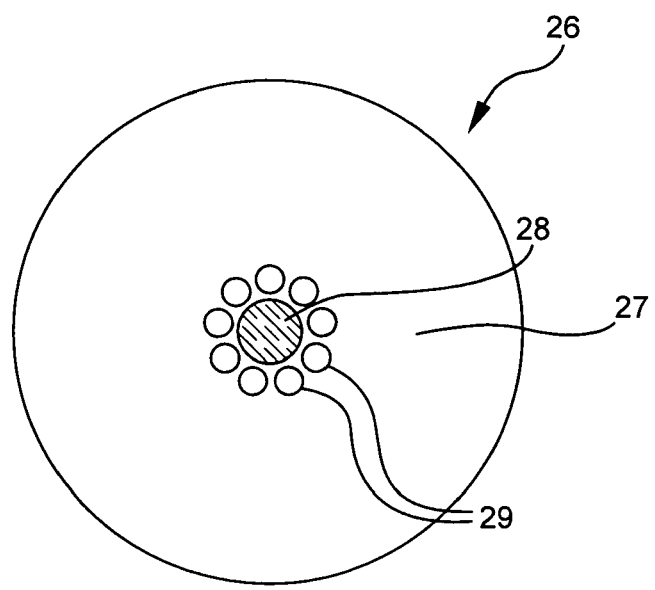
FIG. 4 is a cross-sectioned view of another embodiment of a micro-structured optical fiber which may be used in accordance with the present invention.
Figure 9:
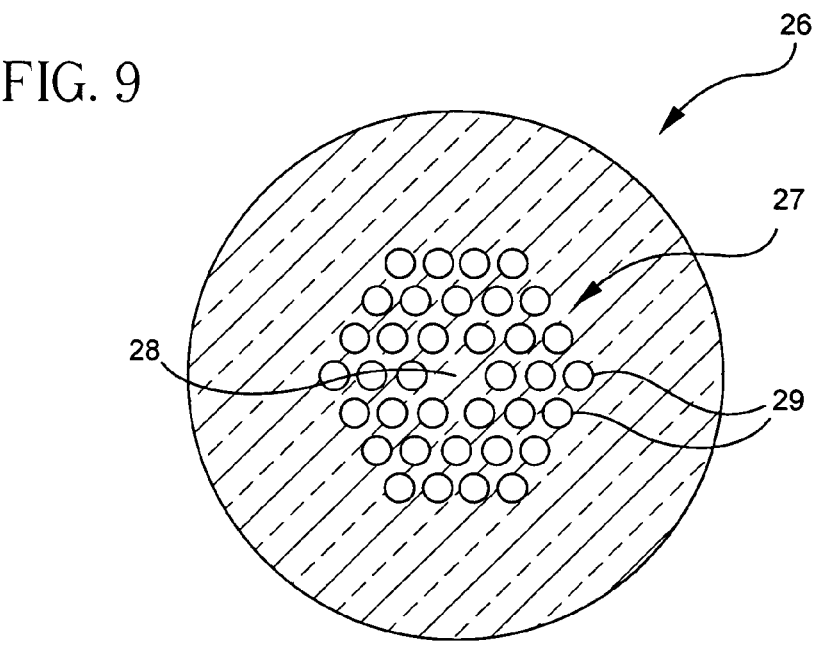
FIG. 9 is a cross-sectioned view of another embodiment of a micro-structured optical fiber which may be used in accordance with the present invention.

The micro-structured optical fiber 26 may have any of the known constructions. Micro-structured optical fiber 26 preferably has, as best shown in FIGS. 2 and 9, a body of silica-containing glass 27 with an arrangement of longitudinally extending holes 29 positioned a distance from a fiber centerline which form the light guiding core 28. FIG. 4 illustrates another micro-structured optical fiber 26 that may be used in the present invention having a body of silica-containing glass 27 with an arrangement of longitudinally extending holes 29 positioned a distance from the fiber's centerline. In this embodiment, the light guiding core 28 is formed from a combination of a germania-doped glass having a refractive index higher than the cladding 27 and air holes 29 surrounding the germania-doped glass.

Figure 10:
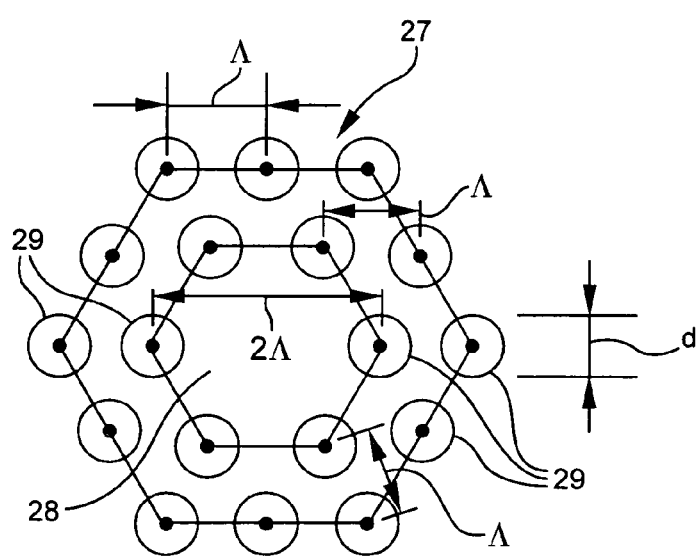
FIG. 10 is a partial enlarged cross-sectioned view of the embodiment of a micro-structured optical fiber of FIG. 9.

To achieve the desired dispersion properties, the micro-structured optical fiber 26 preferably includes longitudinally extending holes 29 that extend along the entire length of the fiber 26 and which have an outer hole diameter, d (See FIG. 10), of between about 1.0 and 3.0 microns; more preferably between about 1.5 and 2.0 microns. The holes 29 are preferably spaced from each other and arranged in a hexagonal lattice arrangement as shown in FIGS. 2, 9 and 10. Preferably, the holes are spaced equa-distant from one another as measured by a center-to-center pitch dimension, $\Lambda$. The pitch dimension, $\Lambda$, of the micro-structured fiber 26 is preferably between 1.5 and 3.0 microns; more preferably between 1.8 and 2.2 microns.

In one embodiment of the invention (See FIGS. 9 and 10), the micro-structured fiber 26 includes at least three lattice layers of holes 29 each being formed in the shape of a hexagon (see lines in FIG. 10 connecting the hole centers to illustrate the lattice shape). FIG. 10 is an enlarged view showing the arrangement of some of the holes 29 of FIG. 9 and illustrating the hexagon pattern and the hole spacing. The spacing of the respective holes is the pitch, $\Lambda$. The spacing and arrangement of the holes in the silica glass 27 forms the light guiding core 28 by forming a area surrounding the core 28 of lower average refractive index. In particular, the spacing across the light guiding core 28 between respective centers of opposing holes 29 is set to be approximately $2\Lambda$. The ratio of the hole radius, r, to the pitch, $\Lambda$, or $r/\Lambda$ is adjusted to achieve the proper total dispersion desired for the micro-structured optical fiber 26. Preferably, the ratio $r/\Lambda$ is between about 0.35 and 0.45; and more preferably between 0.4 and 0.45. The attenuation of the micro-structured optical fiber 26 is preferably less than 1 dB/km at 1550 nm. Thus, for the preferred range of total dispersion (between 100 to 150 ps/nm/km at 1550 nm), the Figure Of Merit (FOM) of the micro-structured optical fiber 26 is preferably at least 100 ps/nm/dB at 1550 nm. This high FOM of the micro-structured optical fiber 26 enables dispersion compensation with a very short length of fiber while reducing the insertion loss, and size of the dispersion compensating module.

By way of example, an embodiment of representative transmission system 20 according to the invention including a length Lt=100 km of transmission fiber 22 having, at 1550 nm, a dispersion Dt=4.2 ps/nm/km, a dispersion slope DSt=0.085 ps/nm$^2$/km, and a kappa of 49 nm optically coupled to a length Ldc=4.75 km of dispersion compensating fiber 24 having, at 1550 nm, a negative dispersion Ddc=−124 ps/nm/km at 1550 nm, dispersion slope DSdc=−1.75 ps/nm$^2$/km, and a kappa of 71 nm, optically coupled to a length Lm=2.2 km of micro-structured optical fiber 26 having, at 1550 nm, a total dispersion Dm=143 ps/nm/km, a dispersion slope DSm=0.028 ps/nm$^2$/km, and a kappa of 5107 nm, results in a residual dispersion over an operating wavelength band from about 1530 to 1562 nm of less than +/−10.8 ps/nm per 100 km of the transmission optical fiber 22. This and other embodiments of transmission systems 20 with various combinations of dispersion compensating 24 and micro-structured optical fiber 26 are shown in Table 1 below.

TABLE 1

Transmission System Examples

| | Ex. # | | | |
|---|---|---|---|---|
| | 1 | 2 | 3 | 4 |
| Lt (km) | 100 | 100 | 100 | 100 |
| Ldc (km) | 4.75 | 5.25 | 5.08 | 5.65 |
| Lm (km) | 2.20 | 1.67 | 3.5 | 2.70 |
| Dt (ps/nm/km) | 4.2 | 4.2 | 4.2 | 4.2 |
| Ddc (ps/nm/km) | −124 | −124 | −142 | −142 |
| Dm (ps/nm/km) | 110 | 143 | 110 | 143 |
| DSt (ps/nm$^2$/km) | 0.085 | 0.085 | 0.085 | 0.085 |
| DSdc (ps/nm$^2$/km) | −1.75 | −1.75 | −1.58 | −1.58 |
| DSm (ps/nm$^2$/km) | 0.071 | 0.028 | 0.071 | 0.028 |
| Kt (nm) | 49 | 49 | 49 | 49 |
| Kdc (nm) | 71 | 71 | 90 | 90 |
| Km (nm) | 1550 | 5107 | 1550 | 5107 |
| Pitch, $\Lambda$ ($\mu$m) | 2.00 | 2.00 | 2.00 | 2.00 |
| r/$\Lambda$ | 0.40 | 0.45 | 0.40 | 0.45 |
| Residual Dispersion (ps/nm) per 100 km | +/−10.8 | +/−12.4 | +/−6.8 | +/−7.3 |

Figure 15:
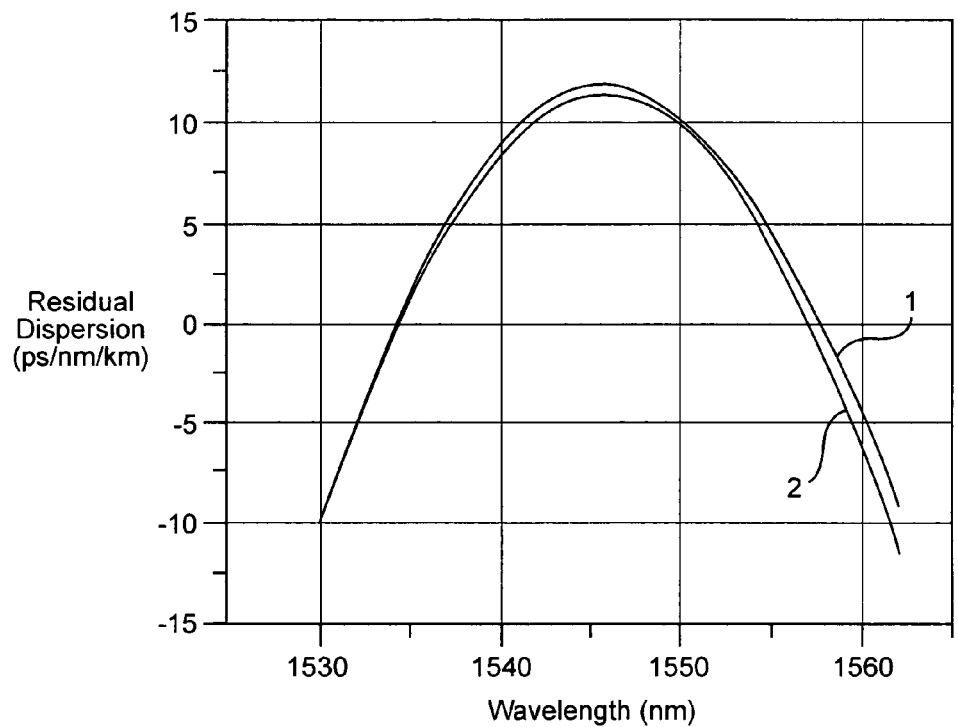
FIGS. 15 and 16 are plots of residual dispersion as a function of wavelength for several embodiments of the present invention.
Figure 16:
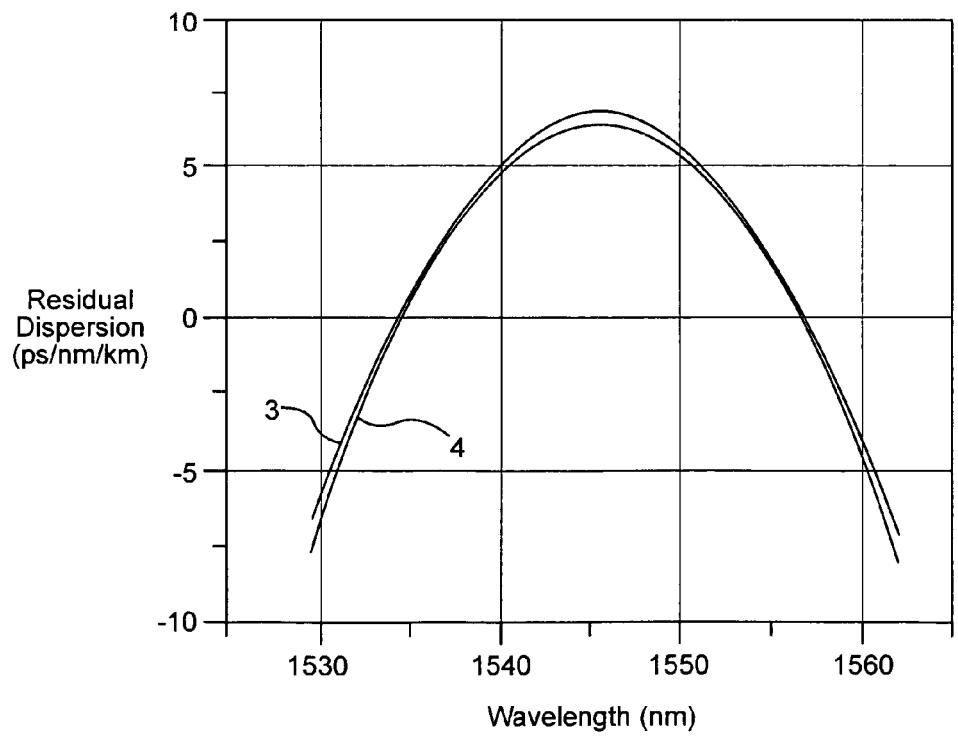

Residual dispersion plots for the labeled examples 1–4 are shown in FIGS. 15 and 16. In particular, it should be recognized that with a very short length of micro-structured optical fiber 26 optically coupled to the dispersion compensating fiber 24 in the system 20, the residual dispersion can readily be made to be less than +/−15 ps/nm per 100 km of transmission fiber 22 over a wavelength band of 1530–1562 nm; and more preferably less than +/−10 ps/nm per 100 km of transmission fiber 22 over the same wavelength band.

Figure 13:
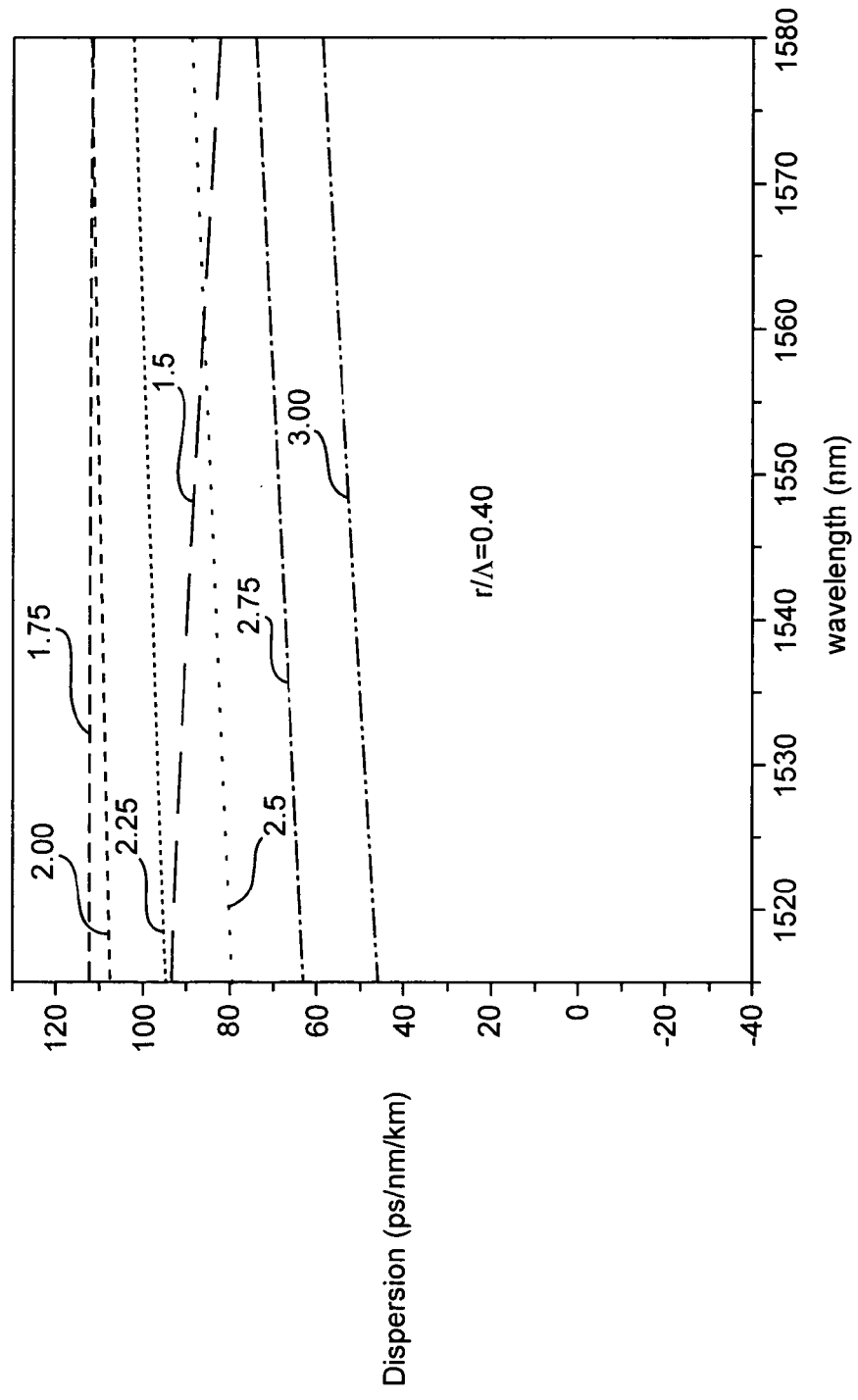
FIGS. 13 and 14 are plots of dispersion as a function of wavelength for several embodiments of micro-structured optical fiber which may be included in the present invention.
Figure 14:
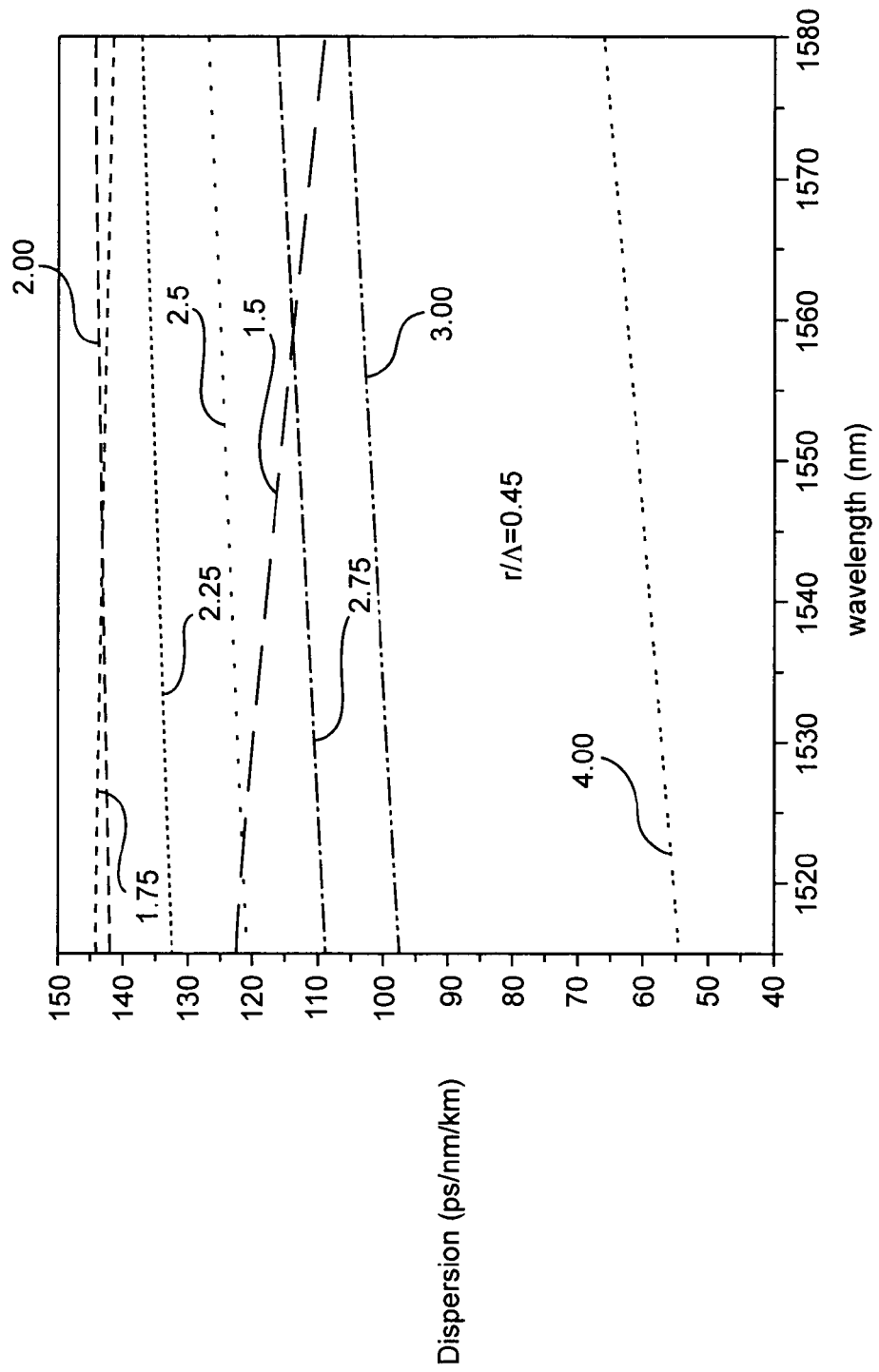

Various micro-structured optical fibers 26 that may be used in the transmission system 20 in accordance with the invention are shown in FIGS. 13 and 14 herein. In particular, as shown in FIGS. 13 and 14, by adjusting the pitch $\Lambda$ (from 1.5 to 4.0 microns) and the ratio $r/\Lambda$ (from 4.0 to 4.5), the dispersion properties of the micro-structured fiber 26 may be altered. Specifically, dispersions at 1550 nm of between about 50 and 150 ps/nm/km may be obtained by varying the pitch $\Lambda$ and the ratio $r/\Lambda$. Increasing the pitch will effectively lower the dispersion of the micro-structured fiber 26 at 1550 nm. Likewise, lowering the ratio $r/\Lambda$ will also effectively lower the dispersion at 1550 nm. Moreover, the dispersion plots for the micro-structured optical fibers 26 are very linear over the desired operating range from 1530–1562 nm. This has the advantage of lowering the residual dispersion of the system.

Figure 5:
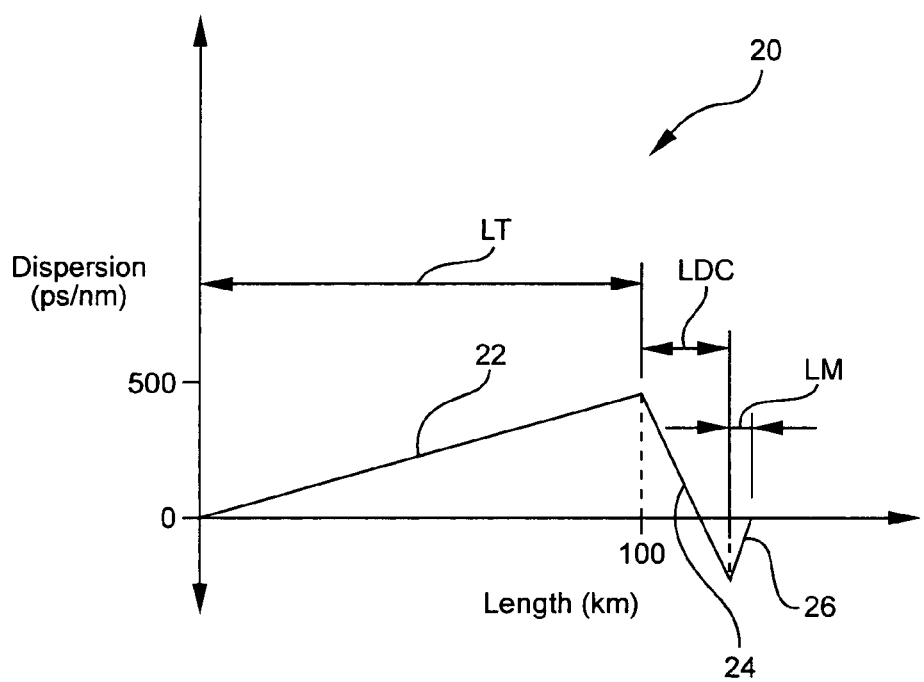
FIG. 5 is a plot of system dispersion as a function of length of the transmission span in accordance with an embodiment of the present invention.
Figure 6:
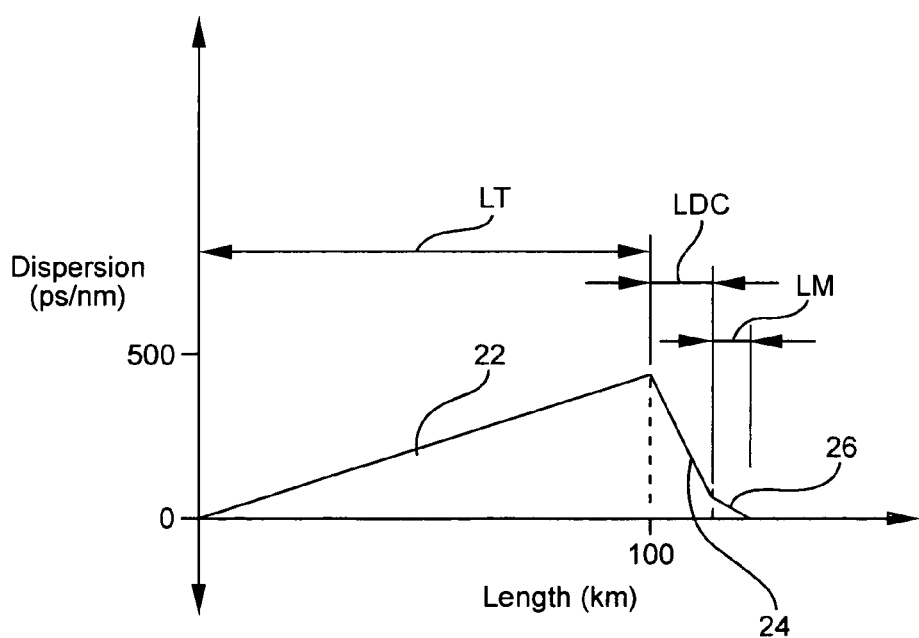
FIG. 6 is a plot of system dispersion as a function of length of the transmission span in accordance with another embodiment of the present invention.

As should be recognized, the transmission fiber 22 has the longest length in the system span, followed by the dispersion compensating fiber 24, followed by the micro-structured fiber 26. According to the invention, for a 100 km span of transmission fiber 22, the dispersion compensating fiber 24 should between 4 and 6 km, and the micro-structured fiber 26 should be between 1 and 4 km. As should be noted, an advantage of the invention is that the length of the microstructured fiber 26 can be made shorter than the length of the dispersion compensating fiber 24. Preferably, the microstructured optical fiber 26 should be spliced to the end of the dispersion compensating fiber 24 such that signal degradation due to nonlinearities is minimized. However, any order to the fibers 22, 24 and 26 may be employed provide that the accumulated dispersion of the transmission span is substantially compensated for. FIG. 5 illustrates a transmission system span in accordance with the present invention. The system 20 includes a length Lt of +Dispersion (+D), +Dispersion Slope (+DS) transmission fiber 22 optically coupled to a length Ldc of –D, –DS dispersion compensating fiber 24. The dispersion compensating fiber in this embodiment overcompensated for dispersion of the 100 km span of transmission fiber. Then coupled to the a dispersion compensation fiber 24 is a length Lm of +D micro-structured fiber 26 which is employed to bring the over-compensated condition back to, or very near, zero. FIG. 6 illustrates an alternate embodiment wherein a length Ldc of a –D, –DS dispersion compensating fiber 24 is used to bring the dispersion at 1550 nm back to an under-compensated condition. A length Lm of –D micro-structured fiber 26 is then employed to bring the over-compensated condition back to, or very near, zero. In FIG. 6, the dispersion of the microstructure fiber 26 is shown to be less negative as compared to the dispersion compensating fiber 24. However, it should be recognized that the total dispersion at 1550 nm could be more negative than that of the dispersion compensating fiber 24 or even equal to it, as well. Several –D micro-structured optical fibers are taught in U.S. Pat. No. 5,802,236 and U.S. patent application Ser. No. 2002/0061176, for example. By way of example, manufacture of micro-structured optical fibers by stacking is taught in U.S. Ser. No. 2003/0056550 and U.S. Pat. No. 6,418,258.

It will be understood that the spans disclosed and described herein may be used in optical connection with one another to form a telecommunications link, which typically can incorporate a variety of other components such as optical amplifiers, couplers, pump lasers, wavelength division multiplexing devices, and electro-optical regenerators. Further, it will be apparent to those skilled in the art that various modifications and variations can be made to the present invention without departing from the scope of the present invention. For example, the order or arrangement of the fibers may be rearranged. Thus it is intended that the present invention cover the modifications and variations of this invention provided they come within the scope of the appended claims and their equivalents.

What is claimed is:

1. An optical transmission system, comprising:
a transmitter and receiver,
an optical fiber span optically coupled to the transmitter and receiver, the span including
a transmission optical fiber having a positive dispersion at 1550 nm,
a dispersion compensating fiber having a negative dispersion at 1550 nm optically coupled to the transmission optical fiber, and
a micro-structured optical fiber optically coupled to the dispersion compensating optical fiber
wherein the dispersion compensating fiber and the micro-structured optical fiber substantially compensate for accumulated dispersion of the transmission optical fiber wherein the dispersion compensating optical fiber has a dispersion slope at 1550 nm of between about −1.4 and −2.0 ps/nm$^2$/km.

2. An optical transmission system, comprising:
a transmitter and receiver,
an optical fiber span optically coupled to the transmitter and receiver, the span including
a transmission optical fiber having a positive dispersion at 1550 nm,
a dispersion compensating fiber having a negative dispersion at 1550 nm optically coupled to the transmission optical fiber, and
a micro-structured optical fiber optically coupled to the dispersion compensating optical fiber
wherein the dispersion compensating fiber and the micro-structured optical fiber substantially compensate for accumulated dispersion of the transmission optical fiber and the dispersion compensating optical fiber has a kappa, defined as total dispersion at 1550 nm divided by total dispersion slope at 1550 nm, of between about 65 and 95 nm.

3. An optical transmission system, comprising:
a transmitter and receiver,
an optical fiber span optically coupled to the transmitter and receiver, the span including
a transmission optical fiber having a positive dispersion at 1550 nm,
a dispersion compensating fiber having a negative dispersion at 1550 nm optically coupled to the transmission optical fiber, and
a micro-structured optical fiber optically coupled to the dispersion compensating optical fiber
wherein the dispersion compensating fiber and the micro-structured optical fiber substantially compensate for accumulated dispersion of the transmission optical fiber and the transmission optical fiber has a total dispersion at 1550 nm of between about 5.3 and 3.2 ps/nm/km.

4. The transmission system of claim 3 wherein the transmission optical fiber has a total dispersion slope at 1550 nm of between about 0.063 and 0.106 ps/nm$^2$/km.

5. The transmission system of claim 3 wherein the transmission optical fiber has a kappa, defined as total dispersion at 1550 nm divided by total dispersion slope at 1550 nm, of between about 40 and 70 nm.

6. An optical transmission system, comprising:
a transmitter and receiver,
an optical fiber span optically coupled to the transmitter and receiver, the span including
a transmission optical fiber having a positive dispersion at 1550 nm,
a dispersion compensating fiber having a negative dispersion at 1550 nm optically coupled to the transmission optical fiber, and
a micro-structured optical fiber optically coupled to the dispersion compensating optical fiber
wherein the dispersion compensating fiber and the micro-structured optical fiber substantially compensate for accumulated dispersion of the transmission optical fiber and wherein the figure of merit of the micro-structured optical fiber is greater than 100 ps/nm/dB.

7. An optical transmission system, comprising:
a transmitter and receiver,
an optical fiber span optically coupled to the transmitter and receiver, the span including
a transmission optical fiber having positive dispersion and dispersion slope at 1550 nm,
a dispersion compensating optical fiber optically coupled to the transmission optical fiber having a negative total dispersion at 1550 nm of between about −100 and −160 ps/nm/km and a negative dispersion slope at 1550 nm, and a micro-structured optical fiber optically coupled to the dispersion compensating optical fiber wherein the micro-structured optical fiber comprises a body of silica-containing glass with an arrangement of holes positioned a distance from a fiber centerline and surrounding a light guiding core, the micro-structured optical fiber having a positive total dispersion at 1550 am of greater than 50 ps/nm/km, wherein the dispersion compensating fiber and the micro-structured optical fiber, in combination, substantially compensate for accumulated dispersion of the transmission optical fiber.

8. The transmission system of claim 7 wherein the micro-structured optical fiber has a pitch, Λ, defined as the spacing between a center a first hole and a center of a second hole closest to the first hole, of between 1.5 and 3.0 microns.

9. The transmission system of claim 7 wherein the micro-structured optical fiber has a ratio r/Λ of between 0.35 and 0.45, wherein Λ is pitch, defined as the spacing between a center a first hole and a center of a second hole closest to the first hole, and r is the radius of the holes.

10. The transmission system of claim 7 wherein the micro-structured optical fiber has a total dispersion at 1550 nm of between about 100 and 150 ps/nm/km.

11. The transmission system of claim 7 wherein the dispersion compensating optical fiber has a negative total dispersion more negative that −75 ps/nm/km at 1550 nm.

12. The transmission system of claim 7 wherein a residual dispersion of the system over a wavelength band of about 1525 nm to about 1575 nm is less than about +/−15 ps/nm per 100 km of the transmission optical fiber.

13. The transmission system of claim 12 wherein the residual dispersion is less than about +/−10 ps/nm per 100 km of the transmission optical fiber.

14. The transmission system of claim 7 wherein the micro-structured optical fiber and the dispersion compensating fiber are included in a dispersion compensating module.

\* \* \* \* \*